US012380765B2

(12) United States Patent
My Chau

(10) Patent No.: US 12,380,765 B2
(45) **Date of Patent: *Aug. 5, 2025**

(54) SECURE GAMING SYSTEMS AND METHODS

(71) Applicant: Phung My Chau, Las Vegas, NV (US)

(72) Inventor: Phung My Chau, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,685

(22) Filed: Apr. 30, 2024

(65) Prior Publication Data

US 2024/0378948 A1 Nov. 14, 2024

Related U.S. Application Data

(63) Continuation of application No. 18/133,519, filed on Apr. 11, 2023, now Pat. No. 11,972,661, which is a continuation of application No. 17/522,157, filed on Nov. 9, 2021, now Pat. No. 11,625,977, which is a continuation of application No. 17/389,329, filed on Jul. 29, 2021, now Pat. No. 11,170,606, which is a continuation of application No. 17/372,368, filed on Jul. 9, 2021, now abandoned.

(60) Provisional application No. 63/050,055, filed on Jul. 9, 2020.

(51) Int. Cl.
*G07F 17/32* (2006.01)

(52) U.S. Cl.
CPC ...... *G07F 17/3225* (2013.01); *G07F 17/3258* (2013.01); *G07F 17/3293* (2013.01)

(58) Field of Classification Search
CPC ............. G07F 17/3225; G07F 17/3258; G07F 17/3293
USPC ................................................ 463/11, 12, 13
See application file for complete search history.

(56) References Cited

U.S. PATENT DOCUMENTS

2006/0084506 A1* 4/2006 Yoseloff .................. G07F 17/32 463/13
2007/0155462 A1* 7/2007 O'Halloran ........... G07F 17/322 463/16
2009/0117959 A1* 5/2009 Nicely ................ G07F 17/3293 463/13
2011/0115160 A1* 5/2011 Snow .................... G07F 17/322 273/292
2012/0119440 A1* 5/2012 Snow .................. G07F 17/3244 273/292
2018/0096560 A1* 4/2018 Lee ...................... G06Q 30/018
(Continued)

*Primary Examiner* — Pierre E Elisca
(74) *Attorney, Agent, or Firm* — Newman Law, LLC

(57) ABSTRACT

Systems and methods of providing secure wagering gaming operations involving randomly generating a plurality of playing cards as a player hand and randomly generating a plurality of playing cards as a dealer hand, distributing a payout responsive to the satisfaction of at least one of the following preset criteria: the player hand establishing a player qualifying hand of a first number of playing cards of the plurality of playing cards in the player hand, wherein the first number of playing cards is greater than a second number of playing cards of the plurality of playing cards in the dealer hand establishing a dealer qualifying hand; or wherein the first number of playing cards is the same as the second number of playing cards, and at least one playing card of the player qualifying hand has a higher rank than each playing card establishing the dealer qualifying hand.

18 Claims, 9 Drawing Sheets

(56) References Cited

U.S. PATENT DOCUMENTS

| | | | | |
|---|---|---|---|---|
| 2018/0225928 | A1* | 8/2018 | Snow | G07F 17/3276 |
| 2019/0385417 | A1* | 12/2019 | Pertgen | G07F 17/3293 |

* cited by examiner

SECURE GAMING SYSTEMS AND METHODS

BACKGROUND OF THE INVENTION

Field of the Invention

The present invention relates to the field of gaming, particularly to the field of wagering games involving real or virtual playing cards, and more particularly to wagering games being configured to maintain the security and integrity of game play while also offering multiple wagering opportunities and enhanced payout awards responsive to satisfaction of a preset criteria.

Background of the Art

Some card games have been modified to be "casino games" in which players do not compete against one another but rather compete against the house, that is, a dealer hand or otherwise place wagers on whether an outcome will be achieved in comparison to a paytable listing rankings and payouts based on the cards that form the player's respective hand, or both.

While many of these casino games are popular, players continually seek new and interesting wagering games to play, whether online or at a casino, while casino operators, both physical and virtual, wish to attract players to their establishments or websites by providing players with opportunities to play new and interesting wagering games. Accordingly, there is a compelling interest in new and interesting wagering games.

SUMMARY OF THE INVENTION

The invention is generally directed to providing secure systems and methods configured to enable the execution of a wagering game involving, among other things, the random generation of one or more winning outcomes from a limited, preset group of definite outcomes which is immediately verifiable.

Some embodiments of the invention are directed to systems and methods configured to provide secure wagering gaming operations through a computerized platform, wherein the computerized platform comprises one or more of each of a data storage device, a processor, a display device, a random number generator and a data communication device, the processor being configured to execute code stored in the data storage device to enable the computerized platform to: detect receipt through the data communication device of a wager received as credit from a player account; responsive to detecting receipt of the wager, initiate a single round of play and actuate the random number generator to randomly assign one or more qualifying hands depicting playing card values from a plurality of qualifying hands stored in the data storage device, wherein each qualifying hand of the plurality of qualifying hands includes at least a specific one, two, three or four playing cards, and the processor facilitating a display of the randomly assigned one or more qualifying hands as one or more jackpot winning hands on the display device, the randomly assigned one or more qualifying hands being enabled as one or more jackpot winning hands and displayed only for the single round of play, wherein the display includes a rank and a suit for each playing card in the one or more jackpot winning hands; subsequent to the display of the one or more jackpot winning hands, randomly generate a plurality of playing cards as a player hand and randomly generate a plurality of playing cards as a dealer hand; compare the player hand and the dealer hand with the plurality of qualifying hands; identify a player qualifying hand in the player hand, the player qualifying hand having a first number of playing cards from one to four, and identify a playing card in the player qualifying hand having a highest rank; identify a dealer qualifying hand in the dealer hand, the dealer qualifying hand having a second number of playing cards from one to four, and identify a playing card in the dealer qualifying hand having a highest rank; distribute a first payout to the player account responsive to the processor determining the satisfaction of at least one of the following preset criteria: 1) wherein the first number is detected as being greater than the second number; or 2) wherein the first number is detected as being the same as the second number, and the playing card in the player qualifying hand having the highest rank is detected as having a higher rank than the playing card in the dealer qualifying hand having the highest rank; and distribute a second payout responsive to the player qualifying hand being detected as matching the rank of each playing card in at least one jackpot winning hand of the one or more jackpot winning hands displayed on the display device.

Some embodiments of the invention are directed to systems and methods configured to provide secure wagering gaming operations through a computerized platform, the computerized platform comprising one or more of each of a data storage device, a processor, a display device, a random number generator and a data communication device, the processor being configured to execute code stored in the data storage device to enable the computerized platform to: detect receipt through the data communication device of a wager received as credit from a player account; responsive to detecting receipt of the wager, actuate the random number generator to randomly assign one or more qualifying hands depicting playing card values from a plurality of qualifying hands stored in the data storage device, wherein each qualifying hand of the plurality of qualifying hands includes at least a specific one, two, three or four playing cards, the processor facilitating a display of the randomly assigned one or more qualifying hands as one or more jackpot winning hands on the display device, wherein the display includes a rank and a suit for each playing card in the one or more jackpot winning hands; randomly generate a plurality of playing cards as a player hand and randomly generate a plurality of playing cards as a dealer hand; compare the player hand and the dealer hand with the plurality of qualifying hands; identify a player qualifying hand in the player hand, the player qualifying hand having a first number of playing cards from one to four, and identify a playing card in the player qualifying hand having a highest rank; identify a dealer qualifying hand in the dealer hand, the dealer qualifying hand having a second number of playing cards from one to four, and identify a playing card in the dealer qualifying hand having a highest rank; distribute a first payout to the player account responsive to the processor determining the satisfaction of at least one of the following preset criteria: wherein the first number is detected as being greater than the second number; or wherein the first number is detected as being the same as the second number, and the playing card in the player qualifying hand having the highest rank is detected as having a higher rank than the playing card in the dealer qualifying hand having the highest rank; and distribute a second payout responsive to the player qualifying hand being detected as matching the rank of each playing card in at least one jackpot winning hand of the one or more jackpot winning hands displayed on the display device.

In some embodiments, the playing cards are selected from a plurality of playing cards having no tens, jacks, queens or kings.

In some embodiments, the player hand and dealer hand each include four playing cards.

In some embodiments, the second payout is increased responsive to the player qualifying hand being detected as matching the suit of each playing card in the at least one jackpot winning hand.

In some embodiments, the plurality of qualifying hands comprises hands which have a specific preset numerical value.

Some embodiments of the invention are directed to a systems and methods configured to provide a secure wagering gaming operations through a computerized platform, the computerized platform comprising one or more of each of a data storage device, a processor, a display device, a random number generator and a data communication device, the processor being configured to execute code stored in the data storage device, the method comprising the steps of: detecting receipt through the data communication device of a wager received as credit from a player account; responsive to detecting receipt of the wager, actuating the random number generator to randomly assign one or more qualifying hands depicting playing card values from a plurality of qualifying hands stored in the data storage device, wherein each qualifying hand of the plurality of qualifying hands includes at least a specific one, two, three or four playing cards, the processor facilitating a display of the randomly assigned one or more qualifying hands as one or more jackpot winning hands on the display device, wherein the display includes a rank and a suit for each playing card in the one or more jackpot winning hands; randomly generating a plurality of playing cards as a player hand and randomly generate a plurality of playing cards as a dealer hand; comparing the player hand and the dealer hand with the plurality of qualifying hands; identifying a player qualifying hand in the player hand, the player qualifying hand having a first number of playing cards from one to four, and identifying a playing card in the player qualifying hand having a highest rank; identifying a dealer qualifying hand in the dealer hand, the dealer qualifying hand having a second number of playing cards from one to four, and identifying a playing card in the dealer qualifying hand having a highest rank; distributing a first payout to the player account responsive to the processor determining the satisfaction of at least one of the following preset criteria: wherein the first number is detected as being greater than the second number; or wherein the first number is detected as being the same as the second number, and the playing card in the player qualifying hand having the highest rank is detected as having a higher rank than the playing card in the dealer qualifying hand having the highest rank; and distributing a second payout responsive to the player qualifying hand being detected as matching the rank of each playing card in at least one of the one or more jackpot winning hands displayed on the display device.

Some embodiments of the invention are directed to a system configured to provide a secure wagering game through a computerized platform, the computerized platform comprising one or more of each of a data storage device, a processor, a display device, a random number generator and a data communication device, the processor being configured to execute code stored in the data storage device to enable the computerized platform to: detect receipt through the data communication device of a wager received as credit from a player account; responsive to detecting receipt of the wager, actuate the random number generator to randomly assign one or more qualifying hands depicting playing card values from a plurality of qualifying hands stored in the data storage device, wherein each qualifying hand of the plurality of qualifying hands includes at least a specific one, two, three or four playing cards, the processor facilitating a display of the randomly assigned one or more qualifying hands as one or more jackpot winning hands on the display device, wherein the display includes a rank and a suit for each playing card in the one or more jackpot winning hands; randomly generate a plurality of playing cards as a player hand and randomly generate a plurality of playing cards as a dealer hand; compare the player hand and the dealer hand with the plurality of qualifying hands; identify a player qualifying hand in the player hand, the player qualifying hand having a first number of playing cards from one to four, and identify a playing card in the player qualifying hand having a highest rank; identify a dealer qualifying hand in the dealer hand, the dealer qualifying hand having a second number of playing cards from one to four, and identify a playing card in the dealer qualifying hand having a highest rank; distribute a first payout to the player account responsive to the processor determining the satisfaction of at least one of the following preset criteria: wherein the dealer does not have a qualifying hand; wherein the first number is detected as being greater than the second number; or wherein the first number is detected as being the same as the second number, and the playing card in the player qualifying hand having the highest rank is detected as having a higher rank than the playing card in the dealer qualifying hand having the highest rank; and distribute a second payout responsive to the player qualifying hand being detected as matching the rank of each playing card in at least one jackpot winning hand of the one or more jackpot winning hands displayed on the display device, wherein the second payout is increased responsive to the player qualifying hand being detected as matching the suit of each playing card in the at least one jackpot winning hand.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF SOME EMBODIMENTS OF THE INVENTION

Figure 1:
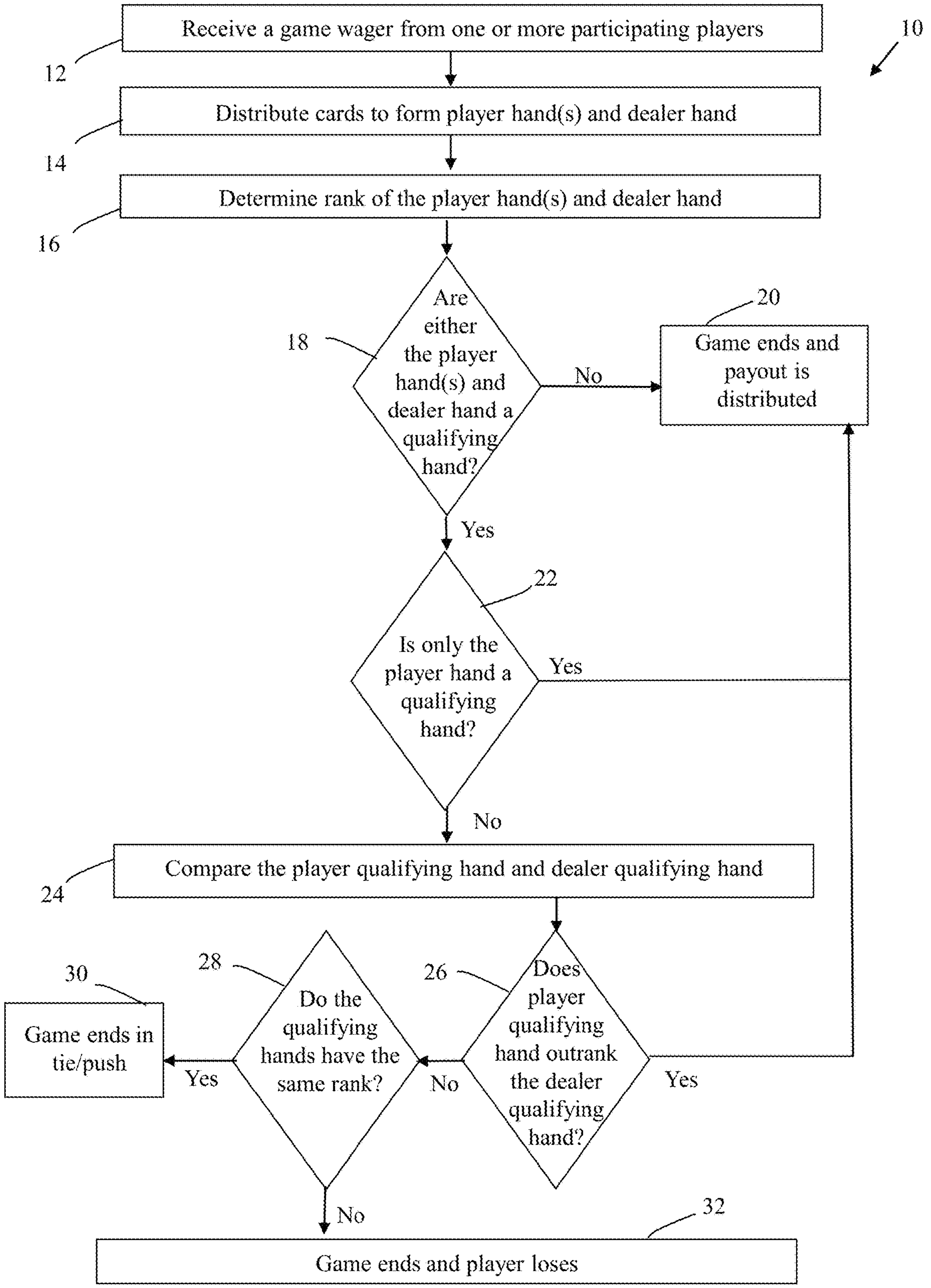
FIGS. 1-3 describe exemplary gaming systems and methods configured and constructed according to various embodiments of the invention.

The invention is directed to systems and methods of providing, hosting and enabling play of wagering game technology, and in particular, secure wagering gaming in which each gaming operator securely receives a verified game wager to participate in a wagering game, actuates a specialized source of randomly generated playing card results which are used to form a player hand for each participating player (that is, a participating player is an individual from which a verified game wager is received) a house or dealer hand and a community group, such as for example, a card shuffling device or shoe with a card identifying reader, a random number generator configured to generate numbers which are assigned by a processing device to a card result from playing card information stored in a memory, or a video streaming service which is used to transmit playing card results to a remote device or terminal. In some embodiments, a portion of the randomly generated playing card results or none the cards in the community group and/or dealer hand are revealed upon being provided.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers generally refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art following the disclosure provided herein, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized, including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, VisualBasic. The program code may execute entirely on the user's computer, partly on the user's computer, as a stand-alone software package, partly on the user's computer and partly on a remote computer or entirely on the remote computer.

A remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider). A user's computer can include a portable electronic device, such as a smartphone or tablet computer, that can communicate wirelessly over data communications networks.

Authentication can include the use of user names, passcodes, biometrics, device identification, Portable electronic device location can also be determined based on GPS or via network communication. Authentication can also include the determination of a user's location based on the location of the user's portable electronic device.

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates an exemplary embodiment of the invention generally designated by the reference numeral 10. In step 12, a wager is received, which is referred to herein as a game wager.

In some embodiments, the placement of the game wager on a display submits the game wager. A display as used herein includes displays such as virtual displays, three-dimensional displays, table layout displays and electronic displays. Accordingly, the receipt of the game wager is accomplished by the movement of an item into a designated position on the display, which is then verified independently as being in position, such as by the confirmation of the position of the game wager on the display by an independent recording, video or image capture device. The receipt of the wager may also correspond with the deduction of the amount of the game wager from a stored a credit balance.

As shown in step 14, cards are distributed from a source of random cards to form a player hand for each participating player and a dealer hand. The source may be a shuffler, card shoe or virtual cards provided on a display with the assistance of a random number generator. In some embodiments of the invention, each player may view one or more cards forming their respective player hand but not the dealer hand until a second, in-game wagering event is completed involving an additional or "play" wager. In some embodiments, after viewing one or more cards in the player hand, each player must place the additional wager to avoid forfeiting the game wager and remain in the round of the game. In other embodiments, the additional wager is optional. The additional wager may be the same as the game wager or different, such as a multiple of the game wager.

As shown in step 16, the rank of the player hands and the dealer hand is determined. In this embodiment the relative rank of a hand is based on the numerical value of one or more of the cards adding up to a value ending in a specific preset number, with any hand including such one or more cards being a qualifying hand. In the embodiments discussed herein the specific preset number is eight, such that any one or more cards being eight or adding up to a number ending in eight is a qualifying hand, such as eight, eighteen or twenty-eight. In other embodiments, the specific preset number is a different number or randomly selected before the start of the game, game session or prior to viewing the player and dealer hands. For purposes of this embodiment, a qualifying hand refers only to the one or more cards in the player hand that, when combined, add up to a numerical value that has the specific preset number as the last number. The relative rank of the qualifying hand against other hands or paytables may also depend on one or both of the amount of cards used to form the qualifying hand, and/or the highest ranking card in the qualifying hand.

Thus, as shown in step 18, if the determination is made that the player hand does not qualify, and the dealer hand is not a qualifying hand, then in step 20 a payout is paid to the player or credited to the player account. The payout may relate to the game wager and/or any additional wager. Alternatively, one or both wagers may push.

As shown in step 22, if the player hand qualifies and the dealer hand is not a qualifying hand then in step 20 a payout is paid to the player or credited to the player account at least responsive to the game wager and/or any additional wager, or in an alternative embodiment, one or both wagers may push.

As shown in step 22, should the player hand qualify and the dealer hand qualify, then the amount of cards in the qualifying hand are compared in step 24. As described above, for purposes of the comparison, a qualifying hand includes only the cards that when added have a numerical value with the specific preset number, which in this example is eight. In this embodiment, the higher number of cards forming the qualifying hand correlates to a higher ranking. For example, a hand having a three card eight is of a higher rank than a hand having a one card eight or a two card eight, regardless of whether the numerical values are eight, eighteen or twenty-eight. In other embodiments, the numerical value may impact the ranking or qualifying hands with the least amount of cards may be higher ranked.

As shown in step 26, should the player qualifying hand outrank the dealer qualifying hand, then a payout is distributed in step 20. As shown in step 28, if the player qualifying hand does not outrank the dealer qualifying hand because the qualifying hands have the same rank then the game ends as a tie as shown in step 30. In this embodiment a tie between the player and dealer qualifying hand is a push. In other embodiments, a tie may be a win or loss. Should the player qualifying hand neither outrank nor tie with the dealer qualifying hand, then the game ends and player loses the game wager and any additional wager as shown in step 32.

In this embodiment, the ranks of only the cards forming the qualifying hands are compared. If the player qualifying hand has the same amount of cards as the dealer qualifying hand, then the highest ranking card included as part of the qualifying hand is compared to determine which hand outranks the other. In some embodiments, the cards have assigned values and ranks based on their order, that is, cards 2 through 10 having their face value, with Jack, Queen, King and Ace having assigned ranks in this order. In some embodiments, all 10s, Jacks, Queens, and Kings have been removed, whereas in other embodiments, Jack, Queen, King have values of 11, 12 and 13, respectively, and Ace has a value of one. Should the player qualifying hand have the highest ranking card then the player wins one or both of the game and any additional wager and a payout is distributed to the player or player account. Should the dealer qualifying hand have the highest ranking card then the player loses one or both of the game and any additional wager. Should the player qualifying hand not have the same amount of cards as the dealer qualifying hand, and the player qualifying hand has less cards than the dealer qualifying hand, then the player loses one or both of the game and any additional wager. Should the dealer qualifying hand have less cards than the player qualifying hand, then the player wins one or both of the game and any additional wager and a payout is distributed.

Figure 2:
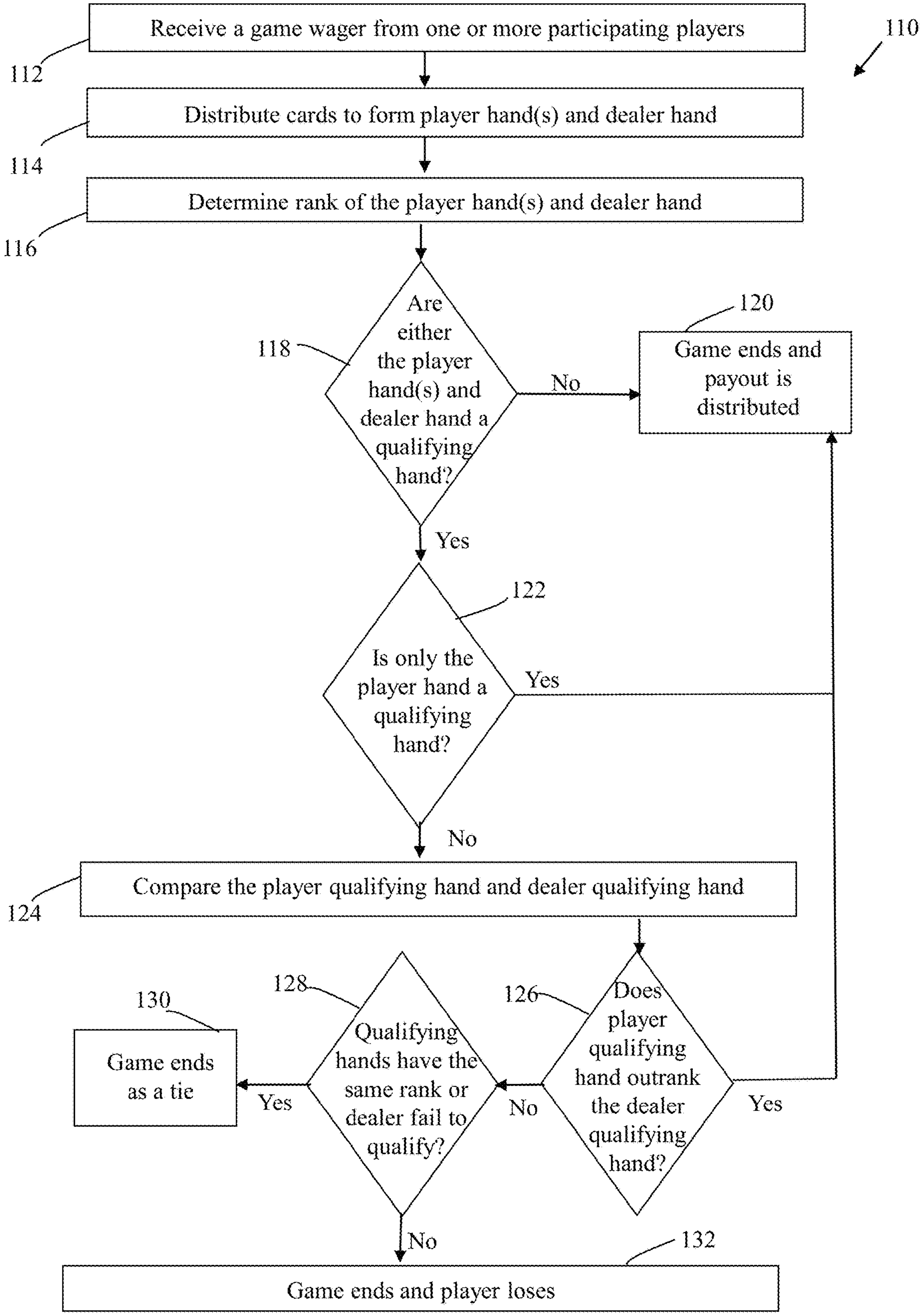

FIG. 2 illustrates another embodiment of the invention generally indicated by the reference number 110 in which a qualifying dealer hand must at least meet a preset qualification criteria otherwise the game wager and any additional wager pushes, as shown by steps 128 and 130.

The player and dealer hands may be dealt the same or a different amount of cards. In some embodiments, the player and dealer hands each have four cards. In other embodiments, the player and dealer hands each have three, four or five cards.

In some embodiments, side wagers may be placed based on the satisfaction of certain preset criteria. For example, a side wager may be placed on the cards in the player hand, dealer hand, qualifying player hand or qualifying dealer hand forming a poker rank or compared with a paytable. A side wager may be placed on the player hand and/or dealer hand having no qualifying hand, that is, no cards of a numerical value with the specific preset number as the last number. For example, a hand of cards that neither includes nor adds up to eight.

In some embodiments, the invention further includes a processor in communication with a source of random cards or numbers for displaying a qualifying hand. A player may place a wager to actuate the random generation of one or more qualifying hands, which if partially or fully matched in the round of the game, results in the player receiving a payout, such as all or a portion of a progressive jackpot payout, depending on the amount of cards in the qualifying hand and how much of the particular qualifying hand is matched by the player hand. For example, if a hand is matched in rank only, then a first payout is distributed, whereas if a hand is matched in rank and suit, a second payout is distributed that is greater than the first payout. Payouts may therefore be based on whether the rank is matched, and then increased based on the number of matching suits.

In the embodiments discussed herein, the payouts may also be increased based on the number of cards in the randomly selected qualifying hand. For example, if the randomly selected qualifying hand is a two card hand, then the total possible payout is less than the possible payout for a randomly selected qualifying hand which is a three or four card hand.

An exemplary paytable for an embodiment of the invention in which each of the player hands consists of four cards, and therefore qualifying hands may comprise up to four cards, is shown in the table below. Winning qualifying hand or hands are displayed and then qualifying player hands are compared with the table below, which may be stored in memory for comparison purposes, if the ranks in the player's qualifying hand match with a winning qualifying hand.

| Event | Payout Distributed (per unit wager received) |
|---|---|
| Two card hand, zero suits | 2:1 |
| Two card hand, one suit | 5:1 |
| Two card hand, two suits | 10:1 |
| Three card hand, zero suits | 5:1 |
| Three card hand, one suit | 10:1 |
| Three card hand, two suits | 20:1 |
| Three card hand, three suits | 100:1 |
| Four card hand, zero suits | 10:1 |
| Four card hand, one suit | 20:1 |
| Four card hand, two suits | 50:1 |
| Four card hand, three suits | 200:1 |
| Four card hand, four suits | 1000:1 |
| No match | Loss |

To illustrate further, a player may place the wager along with the game wager, with the side wager being placed on a bet sensing device that automatically triggers the processor to actuate the random number generator to select one or more qualifying hands from all possible qualifying hands as well incrementally increase a progressive jackpot meter. The processor may be in further communication with a display device for displaying the randomly selected qualifying hand. In the above example, the qualifying hand may be three specific cards, such as a Five of Hearts, a Two of Clubs and an Ace of Spades. Thus, a player may win the progressive jackpot if the player receives a qualifying hand of a Five of Hearts, a Two of Clubs and an Ace of Spades during the round of play.

In some embodiments, a bet sensor or dealer interface may be used to trigger the random selection of three hands. The first hand is a two-card qualifying hand, the second hand is a three-card qualifying hand, and the third hand is a four-card qualifying hand. Each card of the three, randomly selected qualifying hands is displayed on a display device at a gaming table before cards are distributed to form each player hand. The player hand from each player who placed the wager is compared with the three, randomly selected displayed qualifying hands. Players will receive an odds payout responsive to receiving a player qualifying hand matching the rank of each card in at least one of the three displayed qualifying hands, with the greatest odds payout being associated with a match of the displayed four-card hand. Players will receive a greater odds payout responsive to receiving a hand that is an exact match of the rank and suit in at least one of the three displayed qualifying hands, with the greatest odds payout being associated with an exact match of the displayed four-card hand. In this embodiment, cards which are not part of the player's qualifying hand are not considered when comparing the player's qualifying hand with the displayed qualifying hands.

An exemplary list of hands in an embodiment of the invention in which the player and dealer hands each include four cards, shown by numerical values and in order of best to worst is as follows: 999A, 9982, 9973, 9964, 9955, 9883, 9874, 9865, 9775, 9766, 97AA, 962A, 953A, 9522, 944A, 9432, 9333, 8884, 8875, 8866, 88AA, 8776, 872A, 863A, 8622, 854A, 8532, 8442, 8433, 7777, 773A, 7722, 764A, 7632, 755A, 7542, 7533, 7443, 665A, 6642, 6633, 6552, 6543, 6444, 5553, 5544, 5AAA, 42AA, 33AA, 322A, 2222, 98A, 972, 963, 954, 882, 873, 864, 855, 774, 765, 666, 6AA, 52A, 43A, 422, 332, 99, 7A, 62, 53,44, and 8, wherein the numerical value represents the card value and "A" represents Ace or a card having numerical value of one. It should be noted that each hand has a numerical value with eight in the ones place, that is, eight, eighteen or twenty-eight; however, other numerical values may be the specific preset number and therefore a similar set of qualifying hands may be established for such specific preset number. It should also be noted that the deck used in this embodiment is a modified deck of real or virtual cards in which the 10 (Ten), Jack, Queen, and King ranked cards have all been removed.

It should be understood that embodiments of the system described herein, which includes establishing a finite number of qualifying hands in a primary game, and the randomly selecting and displaying of qualifying hands prior to each round for a secondary or side wager, creates a more secure gaming environment which is less subject to being compromised or cheated.

Some embodiments of the invention also may employ the randomly selecting and displaying of winning hands in other games, such as Baccarat. In Baccarat, the system of the invention may be used to randomly select one or more player and/or banker hands of specific cards that are possible player and/or banker hands of cards that could be received in the game, which if matched, partially or wholly, during subsequent play of the game, will result in the distribution of a payout.

Some embodiments of the invention are directed to a systems and methods of providing a wagering game through a computerized platform, such as those discussed herein, which include one or more data storage devices, processors, display devices, random number generators and data communication devices, the processor being configured to execute code stored in one or more of the data storage devices to detect receipt of one or more wagers received and a selection of high or low from each participating player, actuate the random number generator to randomly generate a player hand for each participating player and a dealer hand, the processor facilitating the execution of steps involving the determining of a player qualifying hand and a dealer qualifying hand, wherein a payout is distributed to the player responsive to satisfaction of one of the following preset criteria being met: (1) the player qualifying hand is established by a plurality of cards which is greater in number than the one or more cards establishing the dealer qualifying hand; or (2) the player qualifying hand is established of the same number of one or more cards as the one or more cards establishing the dealer qualifying hand, and at least one card of the one or more cards establishing the player qualifying hand is a card of higher rank than the one or more cards establishing the dealer qualifying hand. Any other result is deemed a loss and the game wager is collected.

Figure 3:
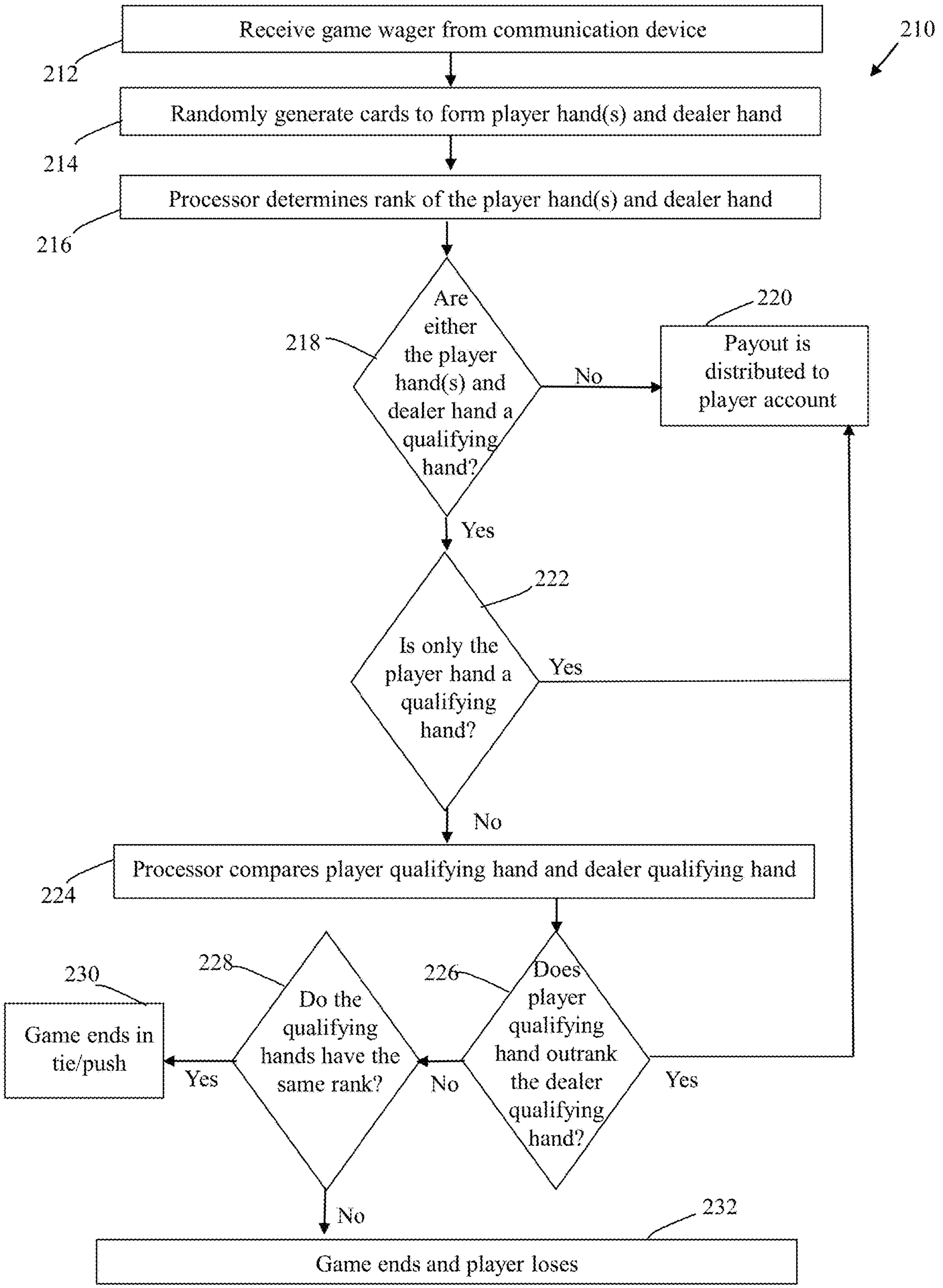

FIG. 3 illustrates an exemplary embodiment of the invention generally designated by the reference number 210 involving interactions between a player and the system of the invention, in which the system includes a processing device, a communication device, a random number generator and a data storage device including depictions of playing cards which may be randomly selected and a list of qualifying hands. The communication device may have access to a player account from which credit can be deducted and added.

In some embodiments the wagering game is conducted using physical playing cards drawn from a randomly ordered group of standard physical playing cards, such as a single deck of playing cards. In other embodiments, the wagering game is conducted by using a random number generator mapped to simulate one or more decks of randomized standard physical playing cards.

In some embodiments the placement of a wager comprises physically placing an implement representing a monetary amount in a designated area on a gaming table surface, the loss and collection of the wager comprises physically removing the implement received from the designated area on the gaming table surface, and the distribution of a payout to the player comprises placing physical implements representing monetary amounts in the designated area of the gaming table surface.

Some embodiments of the invention are directed to systems for providing the above methods, which may include one or more data communication devices, display devices, and processing devices, which may be local or remote, as necessary to provide these methods on any computerized or partially computerized platforms, online or through a local or global communication network, including mobile devices, home computers, single or multiplayer electronic gaming machines enabling play with virtual or real currency and/or virtual or real playing cards, devices or kiosks for enabling wagering on the play of a live wagering game of the invention.

Some embodiments of the invention are also directed to a non-transitory machine readable media for providing a wagering game including one or more software programs, code and/or data segments as necessary to provide any of the methods described herein on one or more machines.

It should be understood that the words "wager," "wagering," "betting" or "bet," or the like, refers to any type of points, money, credits, items of value, including physical or virtual representations thereof, which are placed at stake in that they may be forfeit depending on the occurrence of machine-generated randomly generated outcomes, such as outcomes which may be provided by revealing physical playing cards drawn from one or more decks or groups of randomly-ordered physical playing cards or a random number generator for randomly generating numbers which can be mapped to identify playing card results.

Various platforms are contemplated that are suitable for implementation of embodiments of wagering games according to this disclosure. For example, embodiments of wagering games may be implemented as live table games with an in-person dealer, electronic gaming machines, partially or fully automated table games, and fully automated, network-administered games (e.g., Internet games) that either produce game results utilizing a processor, or produce a live video feed of a dealer administering a game from a remote studio.

As previously noted, any of the present methods and games may be played as a live casino game, as a hybrid casino game (with real or virtual cards), on a multi-player electronic platform, on a personal computer for practice, on a hand-held game for practice, on a legally-authorized site on the Internet, or on a play-for-fun site on the Internet, or through any other communication network.

For example, in one embodiment, the players may be remotely located from a live dealer, and a live dealer and a game table may be displayed to players on their monitors via a video feed. The players' video feeds may be transmitted to the dealer and may also be shared among the players at the table. In a sample embodiment, a central station may include a plurality of betting-type game devices and an electronic camera for each game device. A plurality of player stations, remotely located with respect to the central station, may each include a monitor, for displaying a selected game device at the central station, and input means, for selecting a game device and for placing a bet by a player at the player's station relating to an action involving an element of chance to occur at the selected game device.

Figure 4:
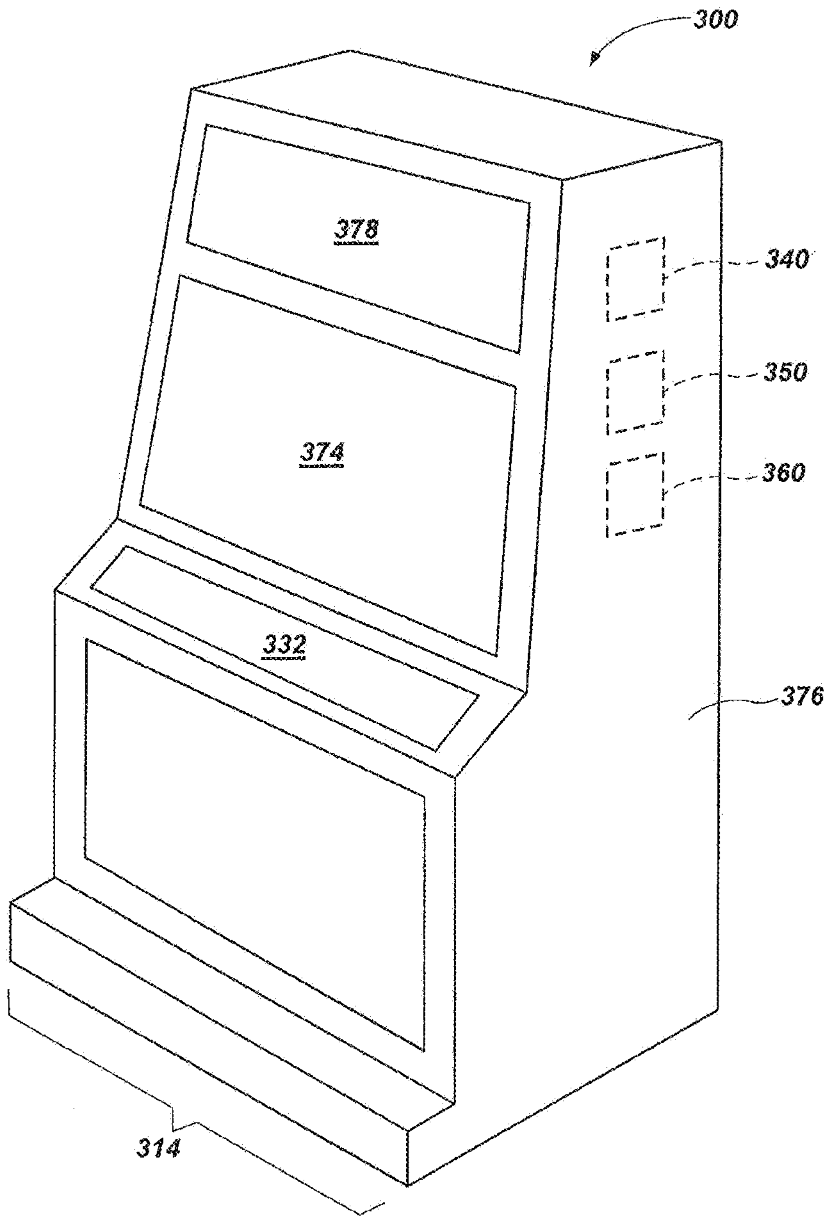
FIG. 4 is a perspective view of an individual electronic gaming device configured for implementation of embodiments of wagering games in accordance with this disclosure.

FIG. 4 is a perspective view of an individual electronic gaming device 300 (e.g., an electronic gaming machine (EGM)) configured for implementing wagering games according to this disclosure. The individual electronic gaming device 300 may include an individual player position 314 including a player input area 332 configured to enable a player to interact with the individual electronic gaming device 300 through various input devices (e.g., buttons, levers, touchscreens). The individual electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, chips or other wagering elements, and live personnel. The action may instead be simulated by a control processor 350 operably coupled to the memory 340 and interacting with and controlling the individual electronic gaming device 300.

Although the individual electronic gaming device 300 displayed in FIG. 4 has an outline of a traditional gaming cabinet, the individual electronic gaming device 300 may be implemented in other ways, such as, for example, client software downloaded to a portable device, such as a smart phone, tablet, or laptop computer. The individual electronic gaming device 300 may also be a non-portable personal computer (e.g., a desktop or all-in-one computer) or other computing device. In some embodiments, client software is not downloaded but is native to the device or is otherwise delivered with the device when distributed.

A communication device 360 may be included and operably coupled to the processor 350 such that information related to operation of the individual electronic gaming device 300, information related to the game play, or combinations thereof may be communicated between the individual electronic gaming device 300 and other devices such as a server through a suitable communication medium, such, as, for example, wired networks, Wi-Fi networks, and cellular communication networks.

The gaming screen 374 may be carried by a generally vertically extending cabinet 376 of the individual electronic gaming device 300. The individual electronic gaming device 300 may further include banners to communicate rules of game play and the like, such as along a top portion 378 of the cabinet 376 of the individual electronic gaming device 300. The individual electronic gaming device 300 may further include additional decorative lights (not shown), and speakers (not shown) for transmitting and optionally receiving sounds during game play.

Some embodiments may be implemented at locations including a plurality of player stations. Such player stations may include an electronic display screen for display of game information according to the invention (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

Figure 5:
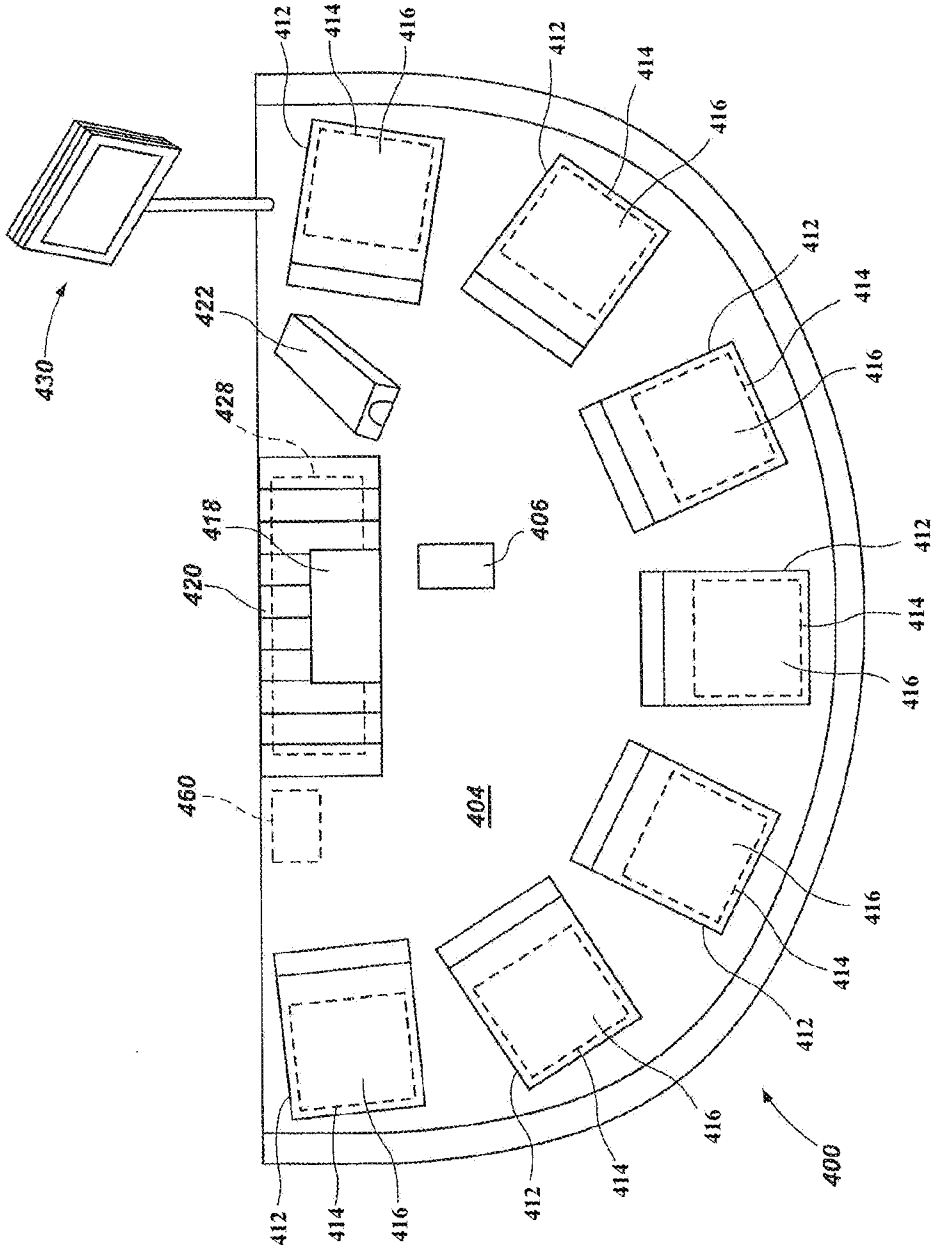
FIG. 5 is a top view of a table configured for implementation of embodiments of wagering games in accordance with this disclosure.

FIG. 5 is a top view of a suitable table 400 configured for implementing wagering games according to this disclosure. The table 400 may include a playing surface 404. The table 400 may include player stations 412. Each player station 412 may include a player interface 416, which may be used for displaying game information (e.g., game instructions, input options, wager information, game outcomes, etc., and accepting player elections). The player interface 416 may be a display screen in the form of a touch screen, which may be at least substantially flush with the playing surface 404 in some embodiments. Each player interface 416 may be operated by its own local game processor 414 (shown in dashed lines), although, in some embodiments, a central game processor 428 (shown in dashed lines) may be employed and may communicate directly with player interfaces 416. In some embodiments, a combination of individual local game processors 414 and the central game processor 428 may be employed.

A communication device 460 may be included and may be operably coupled to one or more of the local game processors 414, the central game processor 428, or combinations thereof, such that information related to operation of the table 400, information related to the game play, or combinations thereof may be communicated between the table 400 and other devices through a suitable communication medium, such as, for example, wired networks, Wi-Fi networks, and cellular communication networks.

Table 400 may further include additional features, such as a dealer chip tray 420, which may be used by the dealer to cash players in and out of the wagering game, whereas wagers and balance adjustments during game play may be performed using, for example, virtual chips (e.g., images or text representing wagers). For embodiments using physical cards, the table 400 may further include a card-handling device 422 (which may be configured to shuffle, read, and deliver physical cards for the dealer and players to use during game play or, alternatively, a card shoe configured to read and deliver cards that have already been randomized) and a designated area for physical cards 406, which may include locations for a dealer's hand. For embodiments using virtual cards, the virtual cards may be displayed at the individual player interfaces 416.

The table 400 may further include a dealer interface 418, which, like the player interfaces 416, may include touch screen controls for receiving dealer inputs and for assisting the dealer in administering the wagering game. The table 400 may further include an upright display 430 configured to display images that depict game information such as pay tables, hand counts, historical win/loss information by player, and a wide variety of other information considered useful to the players.

Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 6:
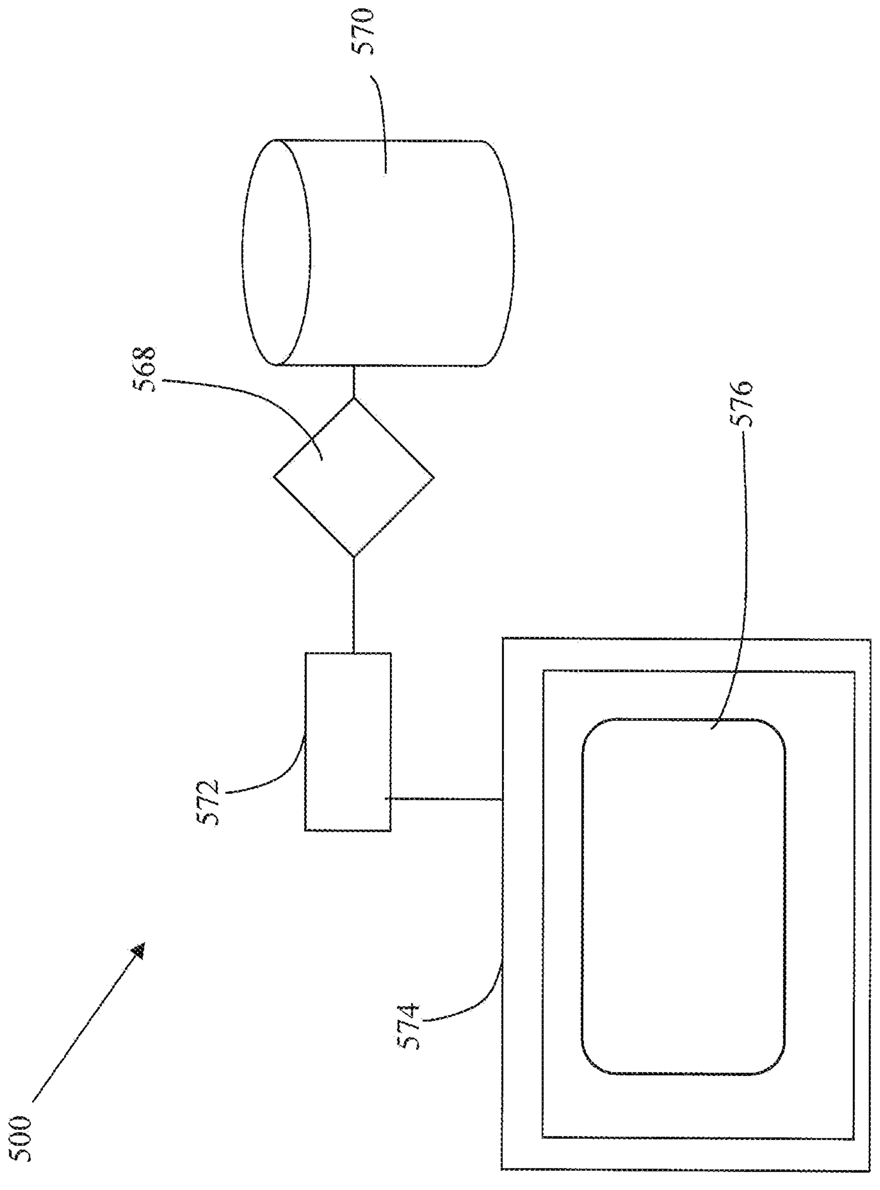
FIG. 6 is a schematic diagram depicting the components of an exemplary system configured and constructed according to some embodiments of the invention.

FIG. 6 illustrates a diagram of an exemplary system 500, which may be a portable device, constructed in accordance with some embodiments of the invention. System 500 includes processing device 568 in communication with a database or memory device 570, communication or data input/output device 572 and a display device 574. In some embodiments, display device 574 is a touch-enabled device and includes a data input device component. Memory device 570 may include data relating to the underlying game and embodiments of the invention as described herein, such as the side wager criteria. A player interface 576 can be presented on display device 574. Player interface 576 may be a virtual representation of a game table layout and/or one or more player positions for facilitating the transmittal and receipt of wagers in accordance with any of the embodiments herein, such as the embodiments of the invention described herein. Game outcomes are displayed and wagers are tracked using display device 574 and processing device 568 compares the respective player and banker hands, including the associated hands as described above and any bonus criteria, and determines an outcome and payout to be displayed on display device 574 accordingly.

Figure 7:
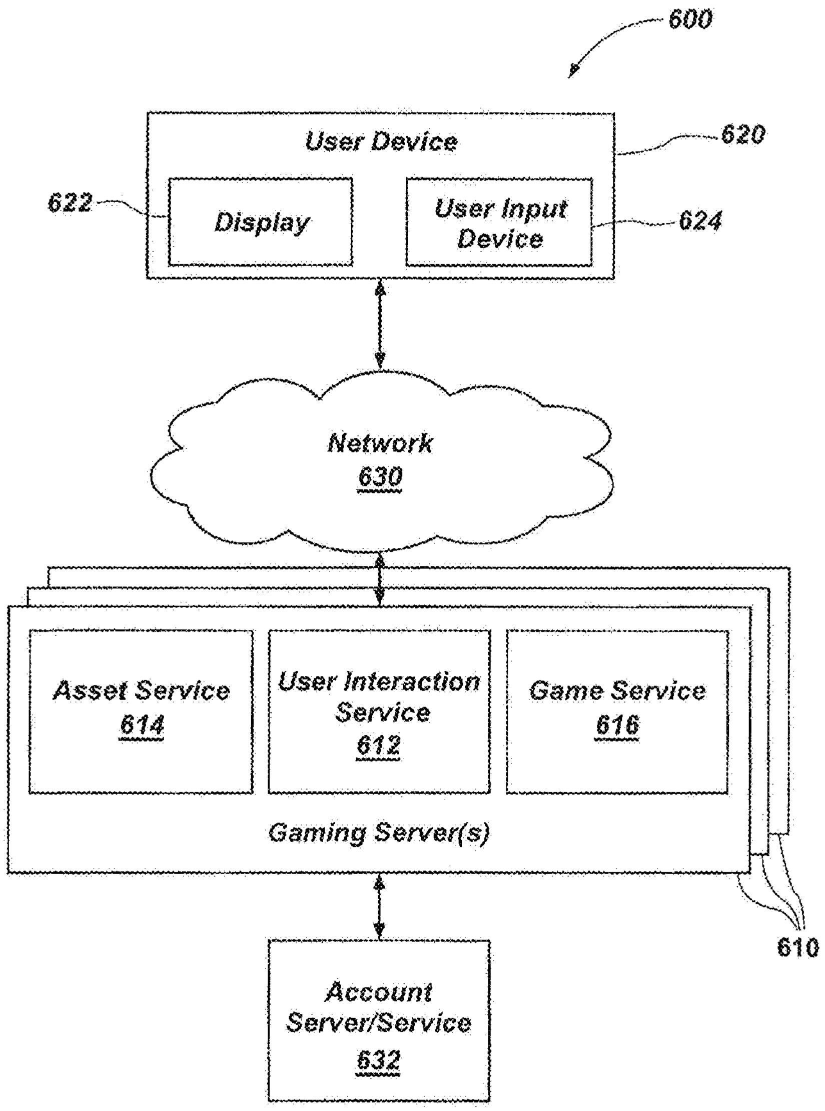
FIG. 7 is a schematic block diagram of a gaming system for implementing embodiments of waging games in accordance with this disclosure.

In some embodiments, wagering games in accordance with this disclosure may be administered using a gaming system employing a client-server architecture (e.g., over the Internet, a local area network, etc.). FIG. 7 is a schematic block diagram of an exemplary gaming system 600 for implementing wagering games so that end users may remotely access games as described herein, among others.

The wagering games of the invention supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform to establish a portal for an end user to access a wagering game hosted by one or more gaming servers 610 over a network 630. In embodiments, games are accessed through a user interaction service 612. The gaming system 600 enables players to interact with a user device 620 through a user input device 624 and a display 622 and to communicate with one or more gaming servers 610 using a network 630 (e.g., the Internet). Typically the user device is remote from the gaming server 610 and the network is the word-wide web (i.e., internet).

In some embodiments, the gaming servers 610 may be configured as a single server to administer wagering games in combination with the user device 620. In other embodiments, the gaming servers 610 may be configured as separate servers for performing separate, dedicated functions associated with administering wagering games. Accordingly, the following description also discusses "services" with the understanding that the various services may be performed by different servers or combinations of servers in different embodiments. As shown in FIG. 7, the gaming servers 610 may include a user interaction service 612, a game service 616, and an asset service 614. In some embodiments, one or more of the gaming servers 610 may communicate with an account server 632 performing an account service 632. As explained more fully below, for some wagering type games, the account service 632 may be separate and operated by a different entity than the gaming servers 610; however, in some embodiments the account service 632 may also be operated one or more of the gaming servers 610.

The user device 620 may communicate with the user interaction service 612 through the network 630. The user interaction service 612 may communicate with the game service 616 and provide game information to the user device 620. In some embodiments, the game service 616 may also include a game engine. The game engine may comprise game rules. In some embodiments, a single user device 620 communicates with a game provided by the game service 616, while other embodiments may include a plurality of user devices 620 configured to communicate and provide end users with access to the same game provided by the game service 616. In addition, a plurality of end users may be permitted to access a single user interaction service 612, or a plurality of user interaction services 612, to access the game service 616. The user interaction service 612 may enable a user to create and access a user account and interact with game service 616. The user interaction service 612 may enable users to initiate new games, join existing games, and interface with games being played by the user.

The user interaction service 612 may also provide a client for execution on the user device 620 for accessing the gaming servers 610. The client provided by the gaming servers 610 for execution on the user device 620 may be any of a variety of implementations depending on the user device 620 and method of communication with the gaming servers 610. In one embodiment, the user device 620 may connect to the gaming servers 610 using a web browser, and the client may execute within a browser window or frame of the web browser. In another embodiment, the client may be a stand-alone executable on the user device 620.

For example, the client may comprise a relatively small amount of script, also referred to as a "script driver," including scripting language that controls an interface of the client. The script driver may include simple function calls requesting information from the gaming servers 610. In other words, the script driver stored in the client may merely include calls to functions that are externally defined by, and executed by, the gaming servers 610. As a result, the client may be characterized as a "thin client." The client may simply send requests to the gaming servers 610 rather than performing logic itself. The client may receive player inputs, and the player inputs may be passed to the gaming servers 610 for processing and executing the wagering game. In some embodiments, this may involve providing specific graphical display information for the display 622 as well as game outcomes.

As another example, the client may comprise an executable file rather than a script. The client may do more local processing than does a script driver, such as calculating where to show what game symbols upon receiving a game outcome from the game service 616 through user interaction service 612. In some embodiments, portions of an asset service 614 may be loaded onto the client and may be used by the client in processing and updating graphical displays. Some form of data protection, such as end-to-end encryption, may be used when data is transported over the network 630. The network 630 may be any network, such as, for example, the Internet or a local area network.

The gaming servers 610 may include an asset service 614, which may host various media assets (e.g., text, audio, video, and image files) to send to the user device 620 for presenting the various wagering games to the end user. In other words, the assets presented to the end user may be stored separately from the user device 620. For example, the user device 620 requests the assets appropriate for the game played by the user; as another example, especially relating to thin clients, just those assets that are needed for a particular display event will be sent by the gaming servers 610, including as few as one asset. The user device 620 may call a function defined at the user interaction service 612 or asset service 614, which may determine which assets are to be delivered to the user device 620 as well as how the assets are to be presented by the user device 620 to the end user. Different assets may correspond to the various user devices 620 and their clients that may have access to the game service 616 and to different variations of wagering games.

The gaming servers 610 may include the game service 616, which may be programmed to administer wagering games and determine game play outcomes to provide to the user interaction service 612 for transmission to the user device 620. For example, the game service 616 may include game rules for one or more wagering games, such that the game service 616 controls some or all of the game flow for a selected wagering game as well as the determined game outcomes. The game service 616 may include pay tables and other game logic. The game service 616 may perform random number generation for determining random game elements of the wagering game. In one embodiment, the game service 616 may be separated from the user interaction service 612 by a firewall or other method of preventing unauthorized access to the game service 612 by the general members of the network 630.

The user device 620 may present a gaming interface to the player and communicate the user interaction from the user input device 624 to the gaming servers 610. The user device 620 may be any electronic system capable of displaying gaming information, receiving user input, and communicating the user input to the gaming servers 610. For example, the user device 620 may be a desktop computer, a laptop, a tablet computer, a set-top box, a mobile device (e.g., a smartphone), a kiosk, a terminal, or another computing device. As a specific, non-limiting example, the user device 620 operating the client may be an interactive electronic gaming system 300 (see FIG. 4) or portable system 500 (see FIG. 6), as described above. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 610. The client may be illustrated within a casino webpage (or other interface) indicating that the client is embedded into a webpage, which is supported by a web browser executing on the user device 620.

In some embodiments, components of the gaming system 600 may be operated by different entities. For example, the user device 620 may be operated by a third party, such as a casino or an individual, that links to the gaming servers 610, which may be operated, for example, by a wagering game service provider. Therefore, in some embodiments, the user device 620 and client may be operated by a different administrator than the operator of the game service 616. In other words, the user device 620 may be part of a third-party system that does not administer or otherwise control the gaming servers 610 or game service 616. In other embodiments, the user interaction service 612 and asset service 614 may be operated by a third-party system. For example, a gaming entity (e.g., a casino) may operate the user interaction service 612, user device 620, or combination thereof to provide its customers access to game content managed by a different entity that may control the game service 616, amongst other functionality. In still other embodiments, all functions may be operated by the same administrator. For example, a gaming entity may elect to perform each of these functions in-house, such as providing access to the user device 620, delivering the actual game content, and administering the gaming system 600.

The gaming servers 610 may communicate with one or more external account servers 632 (also referred to herein as an account service 632), optionally through another firewall. For example, the gaming servers 610 may not directly accept wagers or issue payouts. That is, the gaming servers 610 may facilitate online casino gaming but may not be part of a self-contained online casino itself. Another entity (e.g., a casino or any account holder or financial system of record) may operate and maintain its external account service 632 to accept bets and make payout distributions. The gaming servers 610 may communicate with the account service 632 to verify the existence of funds for wagering and to instruct the account service 632 to execute debits and credits. As another example, the gaming servers 610 may directly accept bets and make payout distributions, such as in the case where an administrator of the gaming servers 610 operates as a casino.

Additional features may be supported by the gaming servers 610, such as hacking and cheating detection, data storage and archival, metrics generation, messages generation, output formatting for different end user devices, as well as other features and operations.

Figure 8:
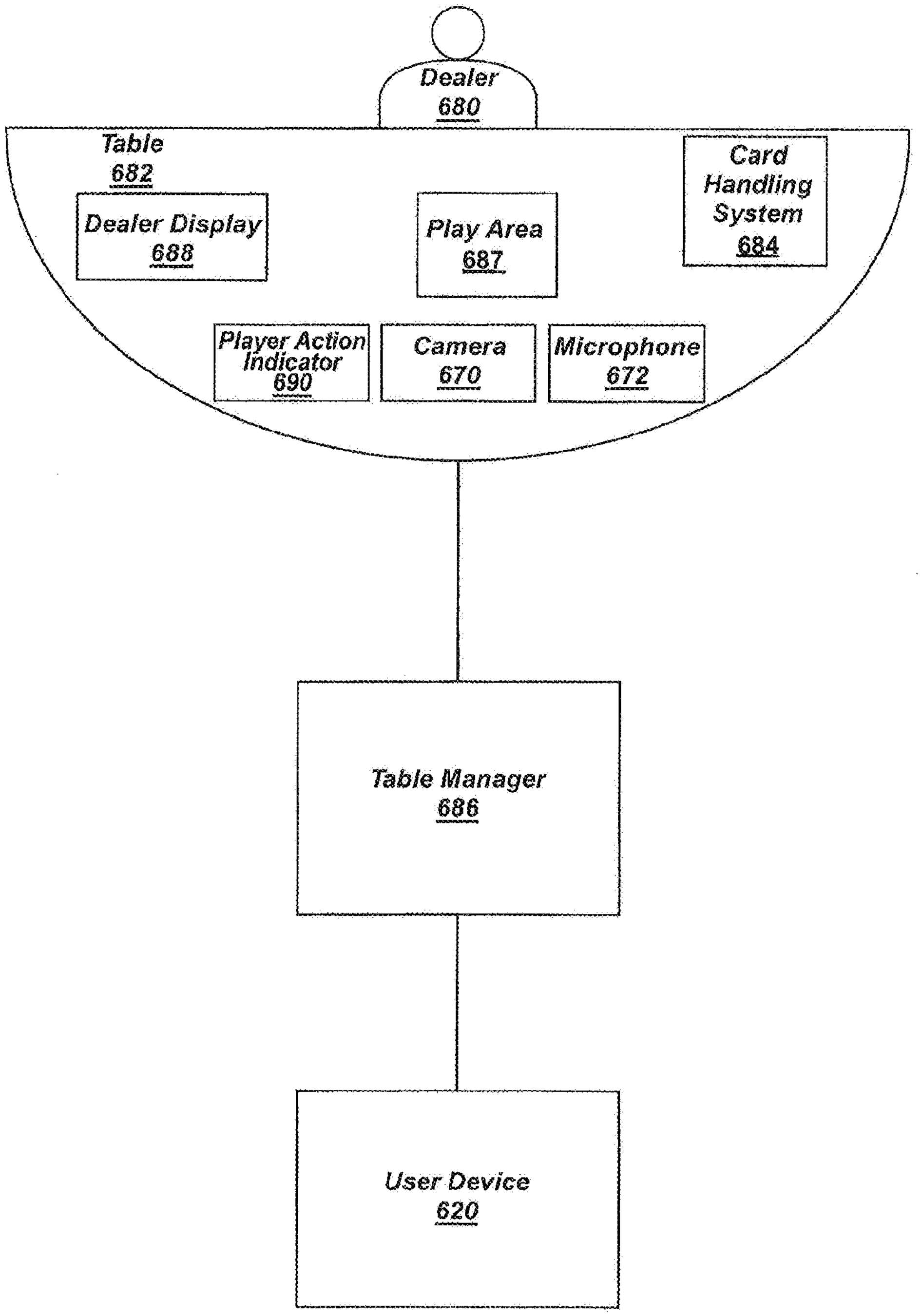
FIG. 8 is a schematic block diagram of a gaming system for implementing embodiments of wagering games including a live dealer feed.

FIG. 8 is a schematic block diagram of a table 682 for implementing wagering games including a live dealer feed. Features of the gaming system 600 described above in connection with FIG. 7 may be utilized in connection with this embodiment, except as further described. Rather than cards being determined by a computerized random processes, physical cards (e.g., from a standard, 52-card deck of playing cards) may be dealt by a live dealer 680 at a table 682 from a card handling system 684. A table manager 686 may assist the dealer 680 in facilitating play of the game by transmitting a video feed of the dealer's actions to the user device 620 and transmitting player elections to the dealer 680. As described above, the table manager 686 may act as or communicate with a gaming system 600 itself or as an intermediate client interposed between and operationally connected to the user device 620 and the gaming system 600 to provide gaming at the table 682 to users of the gaming system 600. Thus, the table manager 686 may communicate with the user device 620 through network 630, and may be a part of a larger online casino, or may be operated as a separate system facilitating game play. In various embodiments, each table 682 may be managed by an individual table manager 686 constituting a gaming device, which may receive and process information relating to that table. For simplicity of description, these functions are described as being performed by the table manager 686, though certain functions may be performed by an intermediary gaming system 600, such as the one shown and described in connection with FIG. 7. In some embodiments, the gaming system 600 may match remotely located players to tables 682 and facilitate transfer of information between user devices 620 and tables 682, such as wagering amounts and player option elections, without managing gameplay at individual tables. In other embodiments, functions of the table manager 686 may be incorporated into a gaming system 600.

The table 682 includes a camera 670 and optionally a microphone 672 to capture video and audio feeds relating to the table 682. The camera 670 may be trained on the dealer 680, play area 687, and card handling system 684. As the game is administered by the dealer 680, the video feed captured by the camera 670 may be shown to the player using the user device 620, and any audio captured by the microphone 672 may be played to the player using the user device 620. In some embodiments, the user device 620 may also include a camera, microphone, or both, which may also capture feeds to be shared with the dealer 680 and other players. In some embodiments, the camera 670 may be trained to capture images of the card faces, chips, and chip stacks on the surface of the gaming table and perform card recognition routines to identify the card rank and suit, which is well known in the art.

Card and wager data in some embodiments may be used by the table manger 686 to determine game outcome. The data extracted from the camera 670 may be used to confirm the card data obtained from the card handling system 684, to determine a player position that received a card, and for general security monitoring purposes.

The live video feed permits the dealer to show cards dealt by the card handling system and play the game as though the player were at a live casino. In addition, the dealer can prompt a user by announcing a player's election is to be performed. In embodiments in which a microphone 672 is included, the dealer 680 can verbally announce action or request an election by a player. In some embodiments, the user device 620 also includes a camera or microphone, which also captures feeds to be shared with the dealer 680 and other players.

The play area 687 may depict a player positions for playing the game. As determined by the rules of the game, the player at the user device 620 may be presented options for responding to an event in the game using a client as described with reference to FIG. 7.

Player selections may be transmitted to the table manager 686, which may display player elections to the dealer 680 using a dealer display 688 and player action indicator 690 on the table 682. For example, the dealer display 688 may display information regarding where to deal the next card or which player position is responsible for the next action.

In some embodiments, the table manager 686 may receive card information from the card handling system 684 to identify cards dealt by the card handling system 684. For example, the card handling system 684 may include a card reader to determine card information from the cards. The card information may include the rank and suit of each dealt card, and/or hand information.

The table manager 686 may apply game rules to the card information, along with the accepted player decisions, to determine gameplay events and wager results. Alternatively, the wager results may be determined by the dealer 680 and input to the table manager 686, which may be used to confirm automatically determined results by the gaming system.

Figure 9:
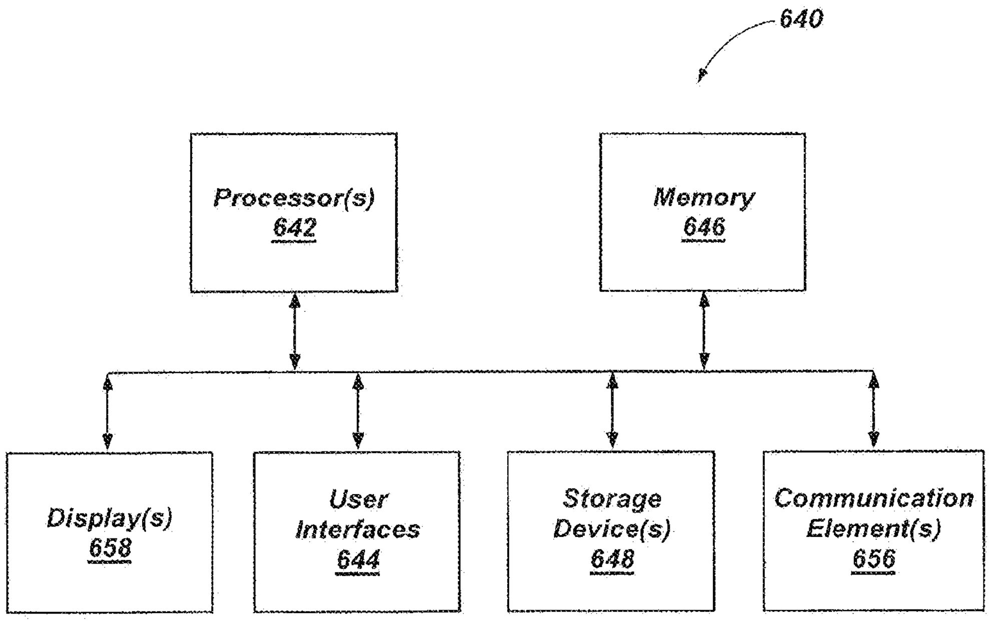
FIG. 9 is a block diagram of a computer for acting as a gaming system for implementing embodiments of wagering games in accordance with this disclosure.

FIG. 9 is a simplified block diagram showing elements of computing devices that may be used in systems and apparatuses of this disclosure. The computing system 640 may be a user-type computer, a file server, a computer server, a notebook computer, a tablet, a handheld device, a mobile device, or other similar computer system for executing software. The computing system 640 may be configured to execute software programs containing computing instructions and may include one or more processors 642, memory 646, one or more displays 658, one or more user interface elements 644, one or more communication elements 656, and one or more storage devices 648 (also referred to herein simply as storage 648).

The processors 642 may be configured to execute a wide variety of operating systems and applications including the computing instructions for administering wagering games of the present disclosure.

The memory 646 may be used to hold computing instructions, data, and other information for performing a wide variety of tasks including administering wagering games of the present disclosure. By way of example, and not limitation, the memory 646 may include Synchronous Random Access Memory (SRAM), Dynamic RAM (DRAM), Read-Only Memory (ROM), Flash memory, and the like.

The display 658 may be a wide variety of displays such as, for example, light emitting diode displays, liquid crystal displays, cathode ray tubes, and the like. In addition, the display 658 may be configured with a touch-screen feature for accepting user input as a user interface element 644.

As non-limiting examples, the user interface elements 644 may include elements such as displays, keyboards, push buttons, mice, joysticks, haptic devices, microphones, speakers, cameras, and touchscreens.

As non-limiting examples, the communication elements 656 may be configured for communicating with other devices or communication networks. As non-limiting examples, the communication elements 656 may include elements for communicating on wired and wireless communication media, such as for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802.11 type wireless networks, cellular telephone/data networks, and other suitable communication interfaces and protocols.

The storage 648 may be used for storing relatively large amounts of nonvolatile information for use in the computing system 640 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 640 may be configured in many different ways with different types of interconnecting buses between the various elements. Moreover, the various elements may be subdivided physically, functionally, or a combination thereof. As one non-limiting example, the memory 646 may be divided into cache memory, graphics memory, and main memory. Each of these memories may communicate directly or indirectly with the one or more processors 642 on separate buses, partially-combined buses, or a common bus.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention may include other examples that occur to those skilled in the art. Other aspects and features of the invention can be obtained from a study of the drawings and the disclosure. The invention may be practiced otherwise than as specifically described herein. It should also be noted, that the steps and/or functions listed herein, notwithstanding the order of which steps and/or functions are listed, are not limited to any specific order of operation.

Those skilled in the art will readily appreciate that the systems and methods described herein may be a standalone system, gaming device, gaming machine or incorporated in an existing gaming system or machine. The system and gaming device of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A system configured to enable secure wagering gaming operations through a computerized platform in communication with an online game server, the computerized platform comprising a display device, the online game server comprising a data storage device, a processor, a random number generator, and a data communication device, the processor being configured to execute code stored in the data storage device to enable the online game server to:

a) actuate the random number generator to randomly assign one or more jackpot winning hands of playing card values for a single round of play of a game, the processor facilitating communication with the computerized platform to cause a display of the one or more jackpot winning hands on the display device, wherein the display includes a rank and a suit for each playing card value of the playing card values in the one or more jackpot winning hands;

b) distribute a plurality of randomly generated playing cards for use in the single round of play of the game, wherein the plurality of randomly generated playing cards are used at least to form one or more hands of playing cards in the single round of play of the game;

c) distribute a first payout for the single round of play of the game responsive to a final outcome being determined based on a rank of the one or more hands of playing cards in the single round of play of the game; and d) distribute a second payout for the single round of play of the game responsive to at least a portion of the plurality of randomly generated playing cards for use in the single round of play of the game matching the playing card values in at least one jackpot winning hand of the one or more jackpot winning hands displayed on the display device, wherein the first payout and the second payout are distributed to a player account stored in the data storage device.

2. The system of claim 1, wherein the one or more hands of playing cards comprise a first hand and a second hand.

3. The system of claim 2, wherein the at least a portion of the plurality of randomly generated playing cards for use in the single round of play of the game comprises one or both of the first hand and the second hand.

4. The system of claim 2, wherein the system is further enabled to compare the first hand and the second hand with the one or more jackpot winning hands.

5. The system of claim 2, wherein the system is further enabled to: determine a first hand rank in the game, wherein the first hand rank is associated with the first hand for the single round of play of the game; and determine a second hand rank in the game, wherein the second hand rank is associated with the second hand for the single round of play of the game.

6. The system of claim 5, wherein the first payout is distributed responsive to a comparison of the first hand rank with the second hand rank.

7. The system of claim 1, wherein the one or more hands of playing cards comprise one or more of a player hand, a dealer hand and a community hand.

8. The system of claim 7, wherein the at least a portion of the plurality of randomly generated playing cards for use in the single round of play of the game comprises one or more of the player hand, the dealer hand and the community hand.

9. The system of claim 1, wherein the one or more hands of playing cards comprise at least one player hand and a dealer hand.

10. The system of claim 9, wherein the at least a portion of the plurality of randomly generated playing cards for use in the single round of play of the game comprises one or more of the at least one player hand and the dealer hand.

11. The system of claim 1, wherein the second payout is increased responsive to the at least a portion of the plurality of randomly generated playing cards for use in the single round of play of the game matching at least one of the rank or the suit of the playing card values in the at least one jackpot winning hand of the one or more jackpot winning hands.

12. The system of claim 1, wherein the game comprises one of Baccarat, Blackjack and poker.

13. The system of claim 1, wherein the system is configured to distribute the plurality of randomly generated playing cards for use in the single round of play of the game subsequent to the display of the one or more jackpot winning hands.

14. A method configured to enable secure wagering gaming operations through an online computerized platform, the online computerized platform comprising a data storage device, a processor, a display device, a random number generator and a data communication device, the processor being configured to execute code stored in the data storage device, the data storage device storing images of playing card values, the method comprising the steps of:

a) actuating the random number generator to randomly assign one or more jackpot winning hands of playing card values from the data storage device for the single round of play of a game, the processor facilitating a display of the one or more jackpot winning hands of playing card values on the display device, wherein the display includes a rank and a suit for each playing card in the one or more jackpot winning hands;

b) displaying a plurality of randomly generated playing card values for use in the single round of play of the game, wherein the plurality of randomly generated playing cards form one or more hands of playing cards in the single round of play of the game;

c) distributing a first payout responsive to a final outcome of the game being determined based on a rank of the one or more hands of playing cards; and d) distributing a second payout responsive to at least a portion of the plurality of randomly generated playing cards for use in the single round of play of the game matching the playing card values of at least one jackpot winning hand of the one or more jackpot winning hands displayed on the display device, wherein the first payout and the second payout are credited to a player account.

15. The method of claim 14, wherein the at least a portion of the plurality of randomly generated playing cards for use in the single round of play of the game comprises the one or more of the hands of playing cards.

16. The method of claim 15, wherein the processor is further enabled to compare the one or more hands of playing cards with the one or more jackpot winning hands.

17. The method of claim 14, wherein the second payout is increased responsive to the at least a portion of the plurality of randomly generated playing cards for use in the single round of play of the game matching at least one of the rank or the suit of the playing card values in the at least one jackpot winning hand of the one or more jackpot winning hands.

18. The method of claim 14, wherein the game comprises one of Baccarat, Blackjack and poker.

* * * * *